(12) United States Patent
Haridas et al.

(10) Patent No.: US 6,527,948 B2
(45) Date of Patent: Mar. 4, 2003

(54) APPARATUS FOR PURIFICATION OF WASTE WATER AND A "RFLR" DEVICE FOR PERFORMING THE SAME

(75) Inventors: Ajit Haridas, Kerala (IN); Swachchha Majumdar, Kerala (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 09/823,906

(22) Filed: Mar. 31, 2001

(65) Prior Publication Data

US 2002/0185418 A1 Dec. 12, 2002

(51) Int. Cl.$^7$ ............................................. B01D 33/70
(52) U.S. Cl. ..................... 210/151; 210/194; 210/197; 210/220
(58) Field of Search .................. 210/150, 151, 210/194, 197, 209, 220, 616, 617, 618, 702, 712, 719, 721, 722, 912, 629

(56) References Cited

U.S. PATENT DOCUMENTS

| | | | |
|---|---|---|---|
| 3,043,433 A | * 1/1962 | Singer ......................... 210/197 |
| RE27,721 E | * 8/1973 | Klock ......................... 210/150 |
| 4,139,456 A | * 2/1979 | Yabuuchi et al. ............ 210/617 |
| 4,482,458 A | * 11/1984 | Rovel et al. ................. 210/150 |
| 4,696,747 A | * 9/1987 | Verstraete et al. ........... 210/617 |
| 4,735,723 A | * 4/1988 | Mulder ........................ 210/617 |
| 4,880,542 A | * 11/1989 | Sublette ...................... 210/617 |
| 5,441,641 A | * 8/1995 | Vail et al. .................... 210/617 |
| 5,445,740 A | * 8/1995 | Malone ....................... 210/150 |
| 5,518,618 A | * 5/1996 | Mulder et al. ............... 210/151 |
| 5,637,220 A | * 6/1997 | Buisman ..................... 210/616 |
| 6,024,876 A | * 2/2000 | Pannier et al. .............. 210/150 |
| 6,036,863 A | * 3/2000 | Brockdorff .................. 210/150 |
| 6,077,424 A | * 6/2000 | Katsukura et al. .......... 210/194 |
| 6,159,369 A | * 12/2000 | Hirane ........................ 210/150 |

* cited by examiner

Primary Examiner—Christopher Upton
(74) Attorney, Agent, or Firm—Dinesh Agarwal, P.C.

(57) ABSTRACT

An embodiment of the present invention relates to a biological process for continues purification of wastewater by converting its constituents to a solid form that can be easily separated using retainable biological catalysts and a novel reactor hereafter referred to as "Reverse Fluidised Loop Reactor" (RFLR) for performing the above said process.

29 Claims, 2 Drawing Sheets

APPARATUS FOR PURIFICATION OF WASTE WATER AND A "RFLR" DEVICE FOR PERFORMING THE SAME

CROSS-REFERENCE TO RELATED APPLICATIONS

Not applicable.

STATEMENTS REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

An embodiment of the present invention relates to a biological process for continues purification of wastewater by converting its constituents to a solid form that can be easily separated using retainable biological catalysts. An embodiment of the present invention also relates to a novel reactor hereafter referred to as "Reverse Fluidized Loop Reactor" (RFLR) for performing the above said process.

2. Related Art Description

Microorganisms have been used for a long time for treatment of water as well as waste water. Some of the newer applications of micro-organisms include oxidation of sulphide and dissolved iron salts to elemental sulphur and iron slats of oxidized forms that can be are removed by precipitation respectively [see for example: Buisman, C. J. N., et al., Biotechnol. and Bioengng. 35, 50–56, (1990)]. Such applications are feasible in the case of dissolved manganese also. The biological removal of sulphide as mainly elemental sulphur, which is essentially insoluble in water, finds application in treatment of sulphide containing wastewater from a variety of industries, in particular, pulp and paper mill effluent and refinery and petrochemical effluents. Sulphide is also generated during the anaerobic treatment of wastewater containing sulfates such as distillery effluents and pharmaceutical effluents. Removal of hydrogen sulphide from gases by scrubbing with water or alkaline or carbonate absorbents also result in a sulphide containing liquor that can be treated and recovered by biological sulphide oxidation processes.

Dissolved iron is present in coal mining and other mining area drainages. These waters are highly acidic and require treatment. Biological oxidation converts dissolved ferrous iron to hydroxide or carbonate ferric ion precipitates which can be easily removed from water. Such a process has been applied for the treatment of acid mine discharges [see for example: Nakamura, K. et al., Water Research 20,1, 73–77 (1986)]. Another application for biological iron removal is for the treatment of drinking water particularly groundwater, which in certain regions contains unacceptable levels of dissolved iron. Manganese is also present in groundwater from certain regions, industrial effluents from steel and manganese plants and in drainage water from coal and iron ore mines. Removal of Manganese is also feasible by biologically oxidizing manganese to form insoluble manganese dioxide and hydroxide precipitates. Although, such processes are currently used only in the form of natural oxidation in systems such as constructed wet lands, it is conceivable that reactor systems operating at higher rate for the controlled removal of manganese by biological oxidation can be developed. Note that all these systems result in the formation of insoluble precipitates.

Another application which results in solid precipitate is biological sulfate reduction when applied for the removal of metals from wastewater. The reduction of sulfate to sulphide is carried out by organisms known as "sulfate reducing bacteria." These bacteria require an energy source or electron donor, which can be simple organic compounds such as methanol or gases containing hydrogen such as producer gas. The use of gas as the energy source is considered a more economic option for larger scale applications. Here again, we have a situation where the desired bacteria—sulfate reducing bacteria—is to be retained within the reactor, provided with a sparingly soluble gaseous reactant, and the final solid product is to be efficiently removed from the reactor.

Conventionally, the aerated reactors have utilized two techniques for maintaining a high concentration of microorganisms in the reactor. In the widely used activated sludge reactors (see for example Metcalf and Eddy Inc. "Wastewater Engineering: Treatment, Disposal and Reuse", Tata McGraw-Hill Publishing Co., New Delhi), sludge is recycled after separation by sedimentation from the effluent liquor. The high concentration of micro-organisms in the reactor takes the form of solid flocs kept in suspension by agitation or aeration in the reactor. The mixed and turbulent nature of suspension ensures effective contact of the biocatalyst—i.e., the micro-organisms with the reactants i.e., oxygen and pollutant materials. When these systems are applied to processes which produce solid waste products, these products cannot be separated from the active biocatalysts in an ordinary sedimentation separation. Thus, there would be an accumulation of the products in the reactor, leading to lower efficiency and possible failure. It is conceivable that expensive post treatment measures to selectively remove the solid waste products from active biocatalysts would enable the functioning of the system.

It is also common to retain micro-organisms as a film on stationary inert packing materials inside the reactor. Such a device is called "biofilm reactor". These systems are better suited to anaerobic process which have no requirement of oxygen or aeration and have an intrinsic slow reaction rate as compared with aerobic systems. When applied to aerated process, the slow mass transfer of reactants to the stationary biofilm does not help in improving the performance.

In aerated process, the biofilm system takes the form of trickling filters where the liquid is sprinkled on top of reactor filled with packing materials which may be either natural random packing of stones or synthetic manufactured media in the form of random packing or structured packing. In these system, it is noteworthy that the liquid is present as discontinuous phase and air as continuous phase. It is also evident that such reactors are unsuited when solid products are generated during the reaction as these products will accumulate on the media. In fact, these systems are not recommended even when sedimentable inert solid are present in the raw wastewater for the same reasons.

There are some systems—"aerated filters"—in which a synthetic packing, submerged in the liquid pool, is aerated from below using diffused aeration apparatus. Such systems again have all the oxygen mass transfer deficiencies of biofilm systems but have the advantage of retained biofilm thus avoiding post sedimentation, and being less affected by variability in the wastewater characteristics such as shock loads or transient toxic loads. It is evident that effective removal of solid products is not possible in the submerged aerated filter.

Another biofilm system is the fluidized bed bioreactor. Here the biofilm is present on carrier material which is retained in suspension within the bioreactor using the liquid velocity applied in upward direction. The constant state of agitation of the carrier particles ensures that mass transfer limitations of stationary biofilm reactors are minimized. The velocity applied is in the "fluidization" regime, i.e.., the upward drag force applied on the biocarrier particle is equal and opposite to the buoyant weight of the particle. In solid-liquid fluidized bed reactors, there is a narrow range of velocity where this is effective. The situation is complicated by the application of aeration. At the top of the fluidized bed reactor, there is a disengagement section where gas, liquid and solids carried over are separated. The liquid velocity that has to applied is quite large and hence, energy consumption of fluidized bed reactors is usually higher than for other types of reactors. The fluidized bed reactor has been used for anaerobic wastewater treatment applications but for aerated systems such application is rare due to the hydrodynamic complication of maintaining stability in a 3 phase fluidized bed. The removal of solid products is also problematic as it requires application of velocities that would carry out the solid product while ensuring the retention of biocarrier particles. It would further reduce the stability of the operating regime.

The concept of the airlift fermentor uses a draft tube system with aeration to set up a circulation flow. This system has been developed and used for conduct of biological reaction without the presence of biocarriers. An extension of the air lift reactor called the biofilm air lift reactor, using biocarriers, has been developed for wastewater treatment [Heijnen J. J. et al., Chem. Eng.Technol., 13,202–208 (1990).]. It has been commercially realized in several installations. The biocarriers are in fluidized state or in circulation in these reactors. The biofilm air lift reactors have a wider range of hydrodynamic operability as compared with the 3 phase fluidized bed reactor.

The concept of reverse fluidized bed reactor refers to the use of biocarrier particles that have a specific gravity lower than the fluid (usually wastewater). The bed of biocarrier particles forms a floating bed on top of the reactor. Fluidization is achieved by the application of fluid velocity in the downward direction. The basic advantage of such a system is the ability to remove solid products by the combined action of sedimentation and concurrent flow of liquid. However, this system is very difficult to realize with aeration because of the instability and very narrow range of downward fluidization velocities. Further, the uniform distribution of liquid to the top of the reactor to enable fluidization without channeling and the removal of rising gases at the same time presents technical problems, so much so that the reverse fluidized bed reactor has not been realized in any practical application. Aeration is only practically possible in an external loop to the reactor and which sets additional limits to the capacity of the reactor.

Reference may be made to Garcia-Calderon, D. et al., Water Res., 32(12), 3593–3600, 1998 and Garcia-Bernet, D. et al., Water Sci. Technol., 38(8–9), 393–399, 1998 wherein the downflow fluidized bed reactor or inverse fluidized bed reactor has been described for application in anaerobic treatment of wastewater. In their description, of down-flow fluidization, particles with a specific gravity smaller than the liquid are fluidized downward by a concurrent flow of liquid. The paper describes the application of the downflow (or inverse) fluidization technology for the anaerobic digestion of red wine distillery wastewater. The carrier employed was ground perlite, an expanded volcanic rock. The biofilm formation and its effect on hydrodynamics of the reverse fluidized bed reactor has been described [Garcia-Calderon, D. et al., Biotechnol. Bioeng., 57(2), 136–144 , 1998]. It should be noted that all these work has been done for anaerobic system not to aerated systems.

The application of inverse fluidization in wastewater treatment from laboratory to full-scale bioreactors has been described in a paper by Karamanev, D. G. and Nikolov, L. N.; Environ. Prog., 15(3), 194–196, 1996. Here, the inverse fluidized bed biofilm reactor is designed so that the biofilm thickness can be controlled to avoid the intrabiofilm diffusional limitations. The basis of the reactor is a draft-tube airlift apparatus. The circulating liquid expands the bed of buoyant particles in the annulus. Initially, the lower bed boundary is well above the lower tube opening. The biofilm, growing on the surface of support particles, increases the overall bioparticle (support particle plus biofilm) diameter. It results in bed expansion and very slow movement of the lower bed level downward until the lower bed level reaches the lower draft tube opening and some of the bioparticles enter the draft tube with the liquid flow. There, due to the strong shear stress, part of the biofilm is removed and the biofilm thickness decreases. Eventually, these bioparticles exit the draft tube and enter the top of the annulus, where the process repeats. This controls the biofilm thickness. In this description, the inverse fluidized bed operates primarily as an expanded fluidized bed, the loop circulation of biocarriers mainly for removal of excess biofilm from heavier particles. There is no intent to use the reactor system for production and removal of solid products in biological sulphide oxidation or iron oxidation or manganese oxidation.

An apparatus for biological treatment of wastewater in downflow mode is disclosed by Shimodaira; U.S. Pat. No. 4,454,038, filed on Oct. 31, 1980, issued on Jun. 12, 1984. A previous patent of same inventors, U.S. Pat. No. 4,256, 573, discloses a processes of biological treatment of wastewater, wherein a downflow fluidized bed is utilized for anaerobic and aerobic wastewater treatment. The basic apparatus disclosed is a downflow fluidized bed with lighter than water biocarrier provided with distributor for uniform liquid distribution on top of the reactor vessel. The apparatus is described for use in nitrification, denitrification and BOD removal. An improvement on the basic apparatus is claimed wherein a draft tube is provided with an aeration system, whereby aeration set up circulation for providing fluidization. The function of the draft tube claimed is for providing an internal loop flow of the liquid for aeration rather external loop flow of liquid by pumping. There are significant and crucial differences between an embodiment of the present invention and those disclosed by Shimodaira. These are enumerated below:

The previous apparatus is not designed or intended for removal of solids. An embodiment of the present invention is specifically for the production and removal of solids, thereby effecting treatment. Thus an embodiment of the present invention has special utility in the biological removal of sulphide, iron and manganese from wastewater.

The apparatus disclosed in the previous invention is a genuine fluidized bed i.e., the intended operation is bed expansion of substantially constant length while an embodiment of the present invention is for a fluidized circulating bed. The maintenance of constant bed expansion is said to be aided by injection or gas formation in the bed. It is crucial to have bed circulation for an apparatus that is intended for reactions that result in the production of solids, in order to achieve adequate removal of inert materials.

The apparatus disclosed in the previous invention envisages carrier material only in the annular space between the draft tube and reactor wall, and hence no significant portion of the reaction inside the draft tube. An embodiment of the present invention on the other hand, has substantial portion of the carrier inside the draft tube in upward motion and significant portion of the reaction takes place inside the draft tube. It is also remarkable that an embodiment of the present invention in a preferred arrangement uses draft tube of diameter such that the cross sectional area of the draft tube is larger than the cross sectional area of the annular space between the draft tube and reactor wall.

The apparatus described in the previous invention requires specially designed liquid distribution to uniformly distribute liquid at the surface of the bed and several arrangements for this is described. Whereas, an embodiment of the present invention being a circulatory fluidized bed, requires no special liquid distribution mechanism. Circulation velocity applied is qualitatively greater than fluidization velocity.

An embodiment of the present invention and its operating regime is specially suited for carrying out biological reactions that produce solid products like elemental sulphur, iron oxides and manganese oxides, which are inorganic, generally of specific gravity substantially greater than biomass and are in finely divided form.

In U.S. Pat. No. 5,019,268, an apparatus is described for aerobic biological wastewater treatment, that comprises lighter than water fluidized beds essential in upflow configuration, but which has to be periodically flushed by downward fluidization for removal of captured solids which may be present in the wastewater. An embodiment of the present invention has a completely different arrangement and purpose.

Oh, Kwang-Joong; et al., Korean J. Chem. Eng., 15(2), 177–181 (1998) Korean Institute of Chemical Engineers, describes a process for removal of hydrogen sulphide by biological oxidation in a three phase fluidized bed bioreactor. Thiobacillus sp. was immobilized on biosands.

The problems with using carrier particles and fixed beds for sulphide oxidation are discussed in a patent (C. J. N. Buisman, U.S. Pat. No. 5,637,220) wherein it is disclosed that product sulphur itself retained in the reactor may serve as biocarriers. This arrangement with large inventory of sulphur held within the reactor is subject to instability due to intense and fast backward reaction to reform sulphide from sulphur when there is failure of aeration or during shutdown. An embodiment of the present invention overcomes these disadvantages by ensuring almost negligible hold-up of sulphur in the reactor. An embodiment of the present invention maintains superior activity of the biocatalysts compared with the disclosed invention because of the lack of contamination of biomass with sulphur. A further advantage of an embodiment of the present invention is the purity of product sulphur is superior as it is not contaminated with biological agents which are retained substantially on attached biofilm.

The use of synthetic material such as plastics like PVC rather than ceramics or sand or activated carbon in three-phase fluidized bed bioreactor is not common. It is noted that here again, the carrier material has specific gravity higher than the fluid. Micro-organism carriers of specific shape and of specific gravity less than that of water for fluidized bed application and their production is described in patents e.g. [JP 11000682 A2 6, January 1999]. Micro-organism carriers made of plastic with variable specific gravity and combination of fluidized bed reactor with a flotation separation system has been described in patents [JP 10192878 A2 28, July 1998]. However, it is noted that the considerable advantage of carriers so as to achieve reverse fluidization in loop flow configuration system is not previously claimed. Further, the essence of an embodiment of the present invention is that it can be applied for the conduct of biological reactions that result in solid products and is effective in removal of solid wastes while retaining active biocatalysts in the reactor.

The use of a sand fluidized bed for oxidation and removal of iron is claimed in a patent application [PCT Int. Appl. WO 9406717 A1 31, March 1994]. The difficult step of separation of oxide precipitates is achieved using high velocity and thus at high energy cost. In an embodiment of the present invention, the separation is efficiently achieved at lower cost by the use of carrier particles lighter than water.

It is therefore strongly desirable to have a reactor which achieves high rates of reaction for the above processes requires to retain the desired population of micro-organisms within the reactor, a sufficiently high number of slow-growing biological agents will be available inside the reactor at all times to carry out the desired reactions and the purity of the effluent and products will be enhanced without passing through a separation stage for the removal of organisms. The reactor should have better capacity to withstand shock loads or starvation phases that tend to inactivate the organisms.

Embodiments of the present invention may be seen as a synergistic combination of airlift biofilm with a downflow fluidized bed, which results in an unexpected, surprising and effective result, particularly when used in a biological wastewater treatment processes wherein solid particles are obtained as a result of the reaction. As such, an embodiment of the present invention comprises a process for the purification of wastewater by the conduct of biological reactions involving the production of solids using biological agents and at least one gaseous reactant. Another embodiment of the present invention comprises a process that can efficiently separate solid biological agents from other solids present in the liquid or generated during the conduct of the reaction for the purification of liquid. Still another embodiment of the present invention comprises a process that enables continuous input of reactants and continuous discharge of liquid products while retaining biological catalysts for continuous reuse. Yet another embodiment of the present invention comprises a process that enables very efficient continuous discharge of solid products of the purification reaction while retaining active biological catalysts for continuous reuse. One more embodiment of the present invention comprises a process that enables mixing of gaseous and liquid reactants and biological catalysts so as to create conditions for the effective conduct of the reaction. One other embodiment of the present invention comprises a process where the activity of biological catalysts can be maintained and prevented from contamination by solid products whereby reduction of reaction rate as a result of mass transfer of reactants is avoided.

Accordingly, embodiments of the present invention relate to a biological process for purification of wastewater using retained biological catalysts. Embodiments of the present invention also relate to a novel reactor hereafter referred to as a "Reverse Fluidized Loop Reactor" (RFLR) useful in performing the above said process.

BRIEF DESCRIPTION OF THE DRAWINGS

In the drawing accompanying this specification.

DETAILED DESCRIPTION OF PREFERRED EMBODIMENTS

Method

A preferred process embodiment of the present invention provides a process for biological treatment of waste water by converting constituents of the water to solid forms which are easily separatable using retainable biological catalysts, said process comprising:

(a) passing the waste water to be treated into a reaction vessel having one or more inlets/nozzles for influx of waste water, one or more outlets/nozzles for removal of the purified water, one or more draft tubes, one or more inlets/nozzles for input of gas/air, and a particulate bed attached with a microbial film;

(b) contacting the waste water to be treated with the particulate bed containing the microbes to convert some of the constituents of the waste water to solid products;

(c) introducing gas/air into the draft tube through gas nozzles in order to form an upward flow of the liquid through the said draft tubes;

(d) segregating the particulate bed from the solid product by the action of buoyancy; removing the treated water from the vessel, in a continuous manner if desired; and (e) removing the particulate solid product from the bottom of the reaction vessel, in a continuous manner if desired.

In an embodiment of the present invention, the gas/air contains at least one reactant component. In another embodiment of the present invention, the reactant components are selected from the group comprising of oxygen and hydrogen. In still another embodiment of the present invention, the draft tubes are constructed to be open at both ends and are mounted off the bottom of the vessel and of vertical length restricted below the level of the liquid in the reaction vessel. In yet another embodiment of the present invention, a mechanism is provide to maintain constant liquid level inside the reactor. In one more embodiment of the present invention, the mechanism to maintain constant liquid level is a valve or a raised outlet tube raised to the level of the liquid present in the reactor. In one another embodiment of the present invention, the gas is mixed with a portion of off-gas exiting from the top of the reaction vessel and recirculating to the said gas nozzles.

In an embodiment of the present invention, a portion of the treated water which has passed through the bed of said particulate carrier may be returned to the reaction vessel. In another embodiment of the present invention, a turbulence free zone may be located below the bottom level of the said draft tube and below the level at which air is introduced at the bottom of the reactor vessel and allowing a settlement of the solid products of the purification process or inert materials heavier than water or the excess microbe attached to the carrier being sloughed off by exerting shearing force upon the microbe-attached carrier, while simultaneously segregating the particulate bed by buoyancy induced flotation.

In another embodiment of the present invention, the solid products of the purification process or inert materials heavier than water or the excess microbe attached to the particulate bed are sloughed off by exerting shearing force. In yet another embodiment of the present invention, the microbes are selected from the group comprising oxidizing and/or reducing microbes. The microbes comprise sulphide oxidizing microbes, iron oxidizing microbes, manganese oxidizing microbes, sulfate reducing microbes, or other suitable microbes. In one more embodiment of the present invention, the said microbes are sulphide oxidizing bacteria and said gas contains oxygen. In one another embodiment of the present invention, the said microbes are iron oxidizing bacteria and the said gas contains oxygen.

In an embodiment of the present invention, the said microbes are manganese oxidizing bacteria and the said gas contains oxygen. In another embodiment of the present invention, the said microbes are sulfate reducing bacteria and the said gas contains hydrogen and the said solid product contains metal sulphides.

In another embodiment of the present invention, the particulate bed has a specific gravity lower than that of the waste water to be treated. In yet another embodiment of the present invention, the particulate bed has a specific gravity between 0.90 and 0.99. In one more embodiment of the present invention, the particulate bed comprises low density polyethylene (LDPE). In one another embodiment of the present invention, the particulate bed contains filter material. In an embodiment of the present invention, the filter material is kaolin. In another embodiment of the present invention, the said particulate bed is made of LDPE containing kaolin as filter material. In still another embodiment of the present invention, the particulate bed is made of particle sized between 1 mm and 10 mm.

In another embodiment of the present invention, the rise of air sets up an upward flow of liquid within the draft tubes and downward flow in the annular space between the reactor and the draft tube(s). In one more embodiment of the present invention, the velocity of circulation set up by the action of rising gas within the draft tube(s) may be adjusted by adjusting the aeration rate, diameter of draft tube and inner diameter of reactor vessel. In one another embodiment of the present invention, the velocity of circulation is greater than the fluidization velocity. In an embodiment of the present invention, the fluidization velocity is defined as the force applied on the biocarrier particle so as to make the upward drag force equal and opposite to the buoyant weight of the particle. In another embodiment of the present invention, the waste water may be input through an opening on top of the vessel.

Another embodiment of the present invention comprises a method for the purification of waste water, said process comprising:

(i) passing the wastewater to be treated, in a continuous manner if desired, into a reaction vessel able to retain a suitable level of liquid and having one or more inlets/nozzles for influx of wastewater and one or more outlets/ nozzles for removal of the reaction products;

(ii) providing one or more draft tubes within the said reaction vessel, the said draft tube(s) being open at both ends, maybe mounted off or near the bottom of the vessel and of vertical length restricted below the level of the liquid in the reaction vessel;

(iii) providing one or more gas inlets/nozzles for input of air or gas, located within the said reaction vessel so as to confine rising bubbles inside the said draft tube(s);

(iv) providing a particulate bed made of material having specific gravity lower than the wastewater to be treated, within the said the reaction vessel so as to partly fill the reaction vessel and float substantially immersed within the liquid in the reaction vessel;

(v) allowing microbes that can form solid products from the impurities present in the wastewater to attach to said particulate bed;

(vi) introducing gas into the said draft tube(s) through the gas nozzle(s) in order to form an upward flow of the liquid through the said draft tube(s), in such a manner that the floating particulate bed is disturbed and the particles that compose the bed are circulated in vertical loops inside the reactor;

(vii) contacting the wastewater to be treated with the particulate bed, thereby converting some of the dissolved contaminants in the wastewater to solid products;

(viii) segregating the particulate bed from the solid reaction products by the action of buoyancy and removing treated water from the reaction vessel, as required or in a continuous manner if desired; and (ix) removing the solid reaction products from the reaction vessel, as required or in a continuous manner if desired, and retaining the particulate bed with its attached microbial film within the said reaction vessel.

Apparatus

A preferred embodiment of an apparatus according to the present invention comprises a device used for biological treatment of wastewater by converting its constituents to solid forms which can be easily separated using biological catalysts, said device comprising a vertically elongated reaction vessel provided with one or more inlets/nozzles for feeding wastewater, one or more outlets/nozzles for removing the treated waste water, one or more inlets/nozzles for the input of gas/air, one or more draft tubes which are open at both ends and mounted near or off of the bottom of the vessel, and of vertical length lesser than the level of water in the vessel, and a particulate bed attached with a microbial film to remove the solid particles present in the waste water. The device is referred to hereafter as a "Reverse Fluidized Loop Reactor" (RFLR).

In an embodiment of the present invention, the device may comprise a funnel shaped bottom, an outlet/nozzle for the removal of settled matter, a lid with one or more outlets/nozzles for the removal of exhaust gases, a device or mechanism to maintain constant level of liquid in the reactor, a pump for recirculating the exhaust gases, and one or more baffles for enhancing the separation of product solids from the liquid effluents.

In another embodiment of the present invention, the invention comprises a new reactor system for carrying out a class of wastewater treatment reactions that require microbial agents that act as catalysts while providing aeration and removing solid products of the reaction. The invention enables retention of biocarriers with an attached biofilm of active microbial agents, kept in agitated and aerated suspension while ensuring effective and continuous removal of solid products including fine sized products of biological processes. The system hereafter referred to as a "Reverse Fluidized Loop Reactor" (RFLR) has biocarrier particles of density lower than that of the fluid (in particular wastewater). The reactor is a vessel or tank of cylindrical or other cross-section as desired. In an embodiment, the reactor is provided with one or more "draft tubes" which are cylindrical tubes open at both ends. The draft tube length is preferably curtailed within the liquid mixture pool of the reactor. Aeration nozzles are provided under or within the draft tubes so as to contain and direct the injected air to rise upward through the draft tubes only. The rise of air sets up an upward flow of liquid within the draft tubes and downward flow in the annular space between the reactor and the draft tube(s). The velocity of circulation set up by the action of rising gas within the draft tube may be adjusted in a wide range by choosing the aeration rate, diameter of draft tube and diameter dimension of reactor vessel. The velocity of circulation for the operation of the RFLR is selected so as to enable carry down of the biocarrier particles in the zone outside the draft tube. The velocity of circulation can be chosen at any value above the fluidization velocity and therefore, there is a wide range of velocities where stable operation of the RFLR is possible. The liquid to be reacted may enter the reactor vessel through port(s) on the sides of vessel or may be input through the top of the vessel. There is no requirement for any special liquid distribution system. The reaction vessel is provided with a disengagement section and a liquid exit nozzle below the level of the aeration nozzles. The dimension of the disengagement section is chosen so that the velocity of liquid flow in this section is below the fluidization velocity of the biocarrier particles. In practice this is easily achieved in most practical applications by merely continuing the reaction vessel without change of cross section below the aeration nozzle level. The bottom of the reaction vessel may be suitably sloped to remove all sedimented solids. In practice, a conical bottom would better facilitate the outflow of sedimented solids. It is conceivable that the bottom portion of the vessel may be designed for the separation by sedimentation of the solid products from the liquid effluent.

A further embodiment of the present invention, the mechanism to maintain constant liquid level inside the reactor is a valve or a raised outlet tube raised to the level of the liquid present in the reactor. In yet another embodiment of the present invention, the input nozzles are terminated either directly underneath the bottom open end of the draft tube or inside the lower end of the draft tube. In one more embodiment of the present invention, the flow of gas/air coming out of the nozzle is in the upward direction. In one another embodiment of the present invention, the flow of gas/air coming out of the nozzle is restricted to the draft tube only.

In an embodiment of the present invention, the gas/air contains at least one reactant component. In another embodiment of the present invention, the reactant gas is selected from the group comprising of oxygen and hydrogen.

In still another embodiment of the present invention, the microbes are selected from the group comprising oxidizing and/or reducing microbes. The oxidizing and reducing microbes comprise sulphide oxidizing microbes, iron oxidizing microbes, manganese oxidizing microbes and sulfate reducing microbes, or other suitable microbes. In yet another embodiment of the present invention, the microbes are sulphide oxidizing bacteria and said gas contains oxygen. In one more embodiment of the present invention, the microbes are iron oxidizing bacteria and the said gas contains oxygen. In one another embodiment of the present invention, microbes are manganese oxidizing bacteria and the said gas contains oxygen. In an embodiment of the present invention, the microbes are sulfate reducing bacteria and the said gas contains hydrogen and the said solid product contains metal sulphides.

In another embodiment of the present invention, the particulate bed is made up materials having specific gravity lower than that of the waste water to be treated. In still another embodiment of the present invention, the specific gravity of the particulate bed is between 0.90 and 0.99. In yet another embodiment of the present invention, the particulate bed is made of low density polyethylene (LDPE).

In one more embodiment of the present invention, the device further consists of a filter medium. In one another embodiment of the present invention, the filter medium is Kaolin.

In an embodiment of the present invention, the particulate bed is made of low density polyethylene containing kaolin as filter material. In another embodiment of the present invention, the particulate bed is made of low density polyethylene containing kaolin as filter material. In still another embodiment of the present invention, the particulate bed floats immersed in the liquid within the vessel. In yet another embodiment of the present invention, the particulate bed is made of particle sized between 1 mm and 10 mm. In one more embodiment of the present invention, the particulate bed floats immersed in the liquid within the vessel. In one another embodiment of the present invention, the floating particulate bed is distributed.

In an embodiment of the present invention, the particles are circulated in vertical loops inside the reactor by the gas/air coming out of the nozzle. In another embodiment of the present invention, the particulate bed is segregated from the solid reaction products by the action of buoyancy. In still another embodiment of the present invention, the solid reaction products are allowed to settle down and removed from the nozzle.

In yet another embodiment of the present invention, excess microbe or solid products or inert materials heavier than water are sloughed off by exerting force. In one more embodiment of the present invention, the said device is divided into floating biocarrier particulate zone, disengagement zone, and a settling zone. In one another embodiment of the present invention, a portion of the treated water which has passed through the bed of said particulate carrier may be returned to the reaction vessel.

In an embodiment of the present invention, a turbulence free zone is located below the bottom level of the said draft tube and below the level at which air is introduced at the bottom of the reactor vessel and allowing a settlement of the solid products of the purification process or inert materials heavier than water or the excess microbe attached to the carrier being sloughed off by exerting shearing force upon the microbe-attached carrier, while simultaneously segregating the particulate bed by buoyancy induced flotation.

DETAILED DESCRIPTION OF THE FIGURES

Figure 1:
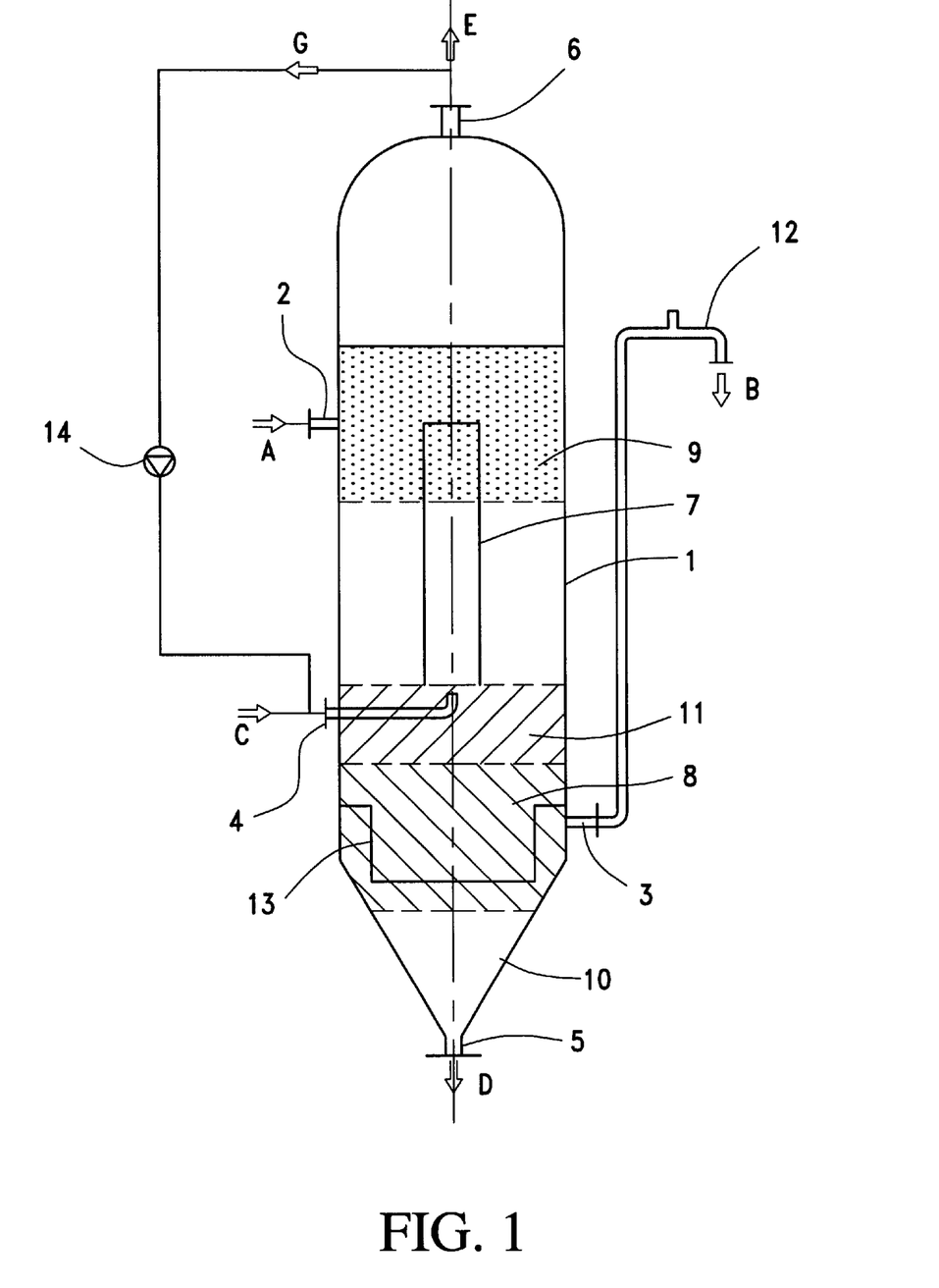
FIG. 1 represents a reactor embodiment in static condition.

In FIG. 1, the reactor vessel is shown as 1. The vessel can be commonly of elongated cylindrical configuration, but can take any other desirable shape depending on convenience. The vessel is provided with a nozzle 2 through its walls, for the input of the liquid reactants, which is primarily the wastewater to be treated (material flow arrow A). The position of nozzle, 2 is arbitrary. The vessel 1 is provided with a nozzle 3 for the removal of reacted liquor, which is primarily the treated wastewater (material flow arrow B). The position of the nozzle 3, is preferably in the zone 8, and should have some mechanism to maintain a constant level of liquid in the vessel 1. Such a mechanism can be a simple elevated outlet with a siphon break shown as 12. The vessel has internally fixed one or more draft tubes 7. These are tubes which are open at both ends. The draft tube is positioned off the bottom of the vessel and restricted within the level of liquid in the vessel. The draft tube is also preferably restricted to the zone well above the bottom of the vessel so as to form a zone 11 and zone 8. The vessel is provided with another nozzle, 4, for the input of gas or air (material flow arrow C). This nozzle is continued inside the vessel to terminate in a position within or directly underneath the bottom open end of the draft tube, 7. The vessel can be preferably provided with a conical bottom, 10, for the collection of settled solids. Another nozzle, 5, which is again optional is provided at the bottom of the vessel for the removal of settled solids (material flow arrow D). The vessel can also be optionally provided with a cover and nozzle, 6, for the conduit of exhaust gases (material flow arrow E). These gases can be recirculated (material flow arrow G) by means of a pump, 14, to nozzle 4. The vessel is filled with biocarrier particles which are in the size range 0.1 to 10mm and made of a material that floats in the liquid contained in the vessel. Thus the particles form a floating bed 9.

Figure 2:
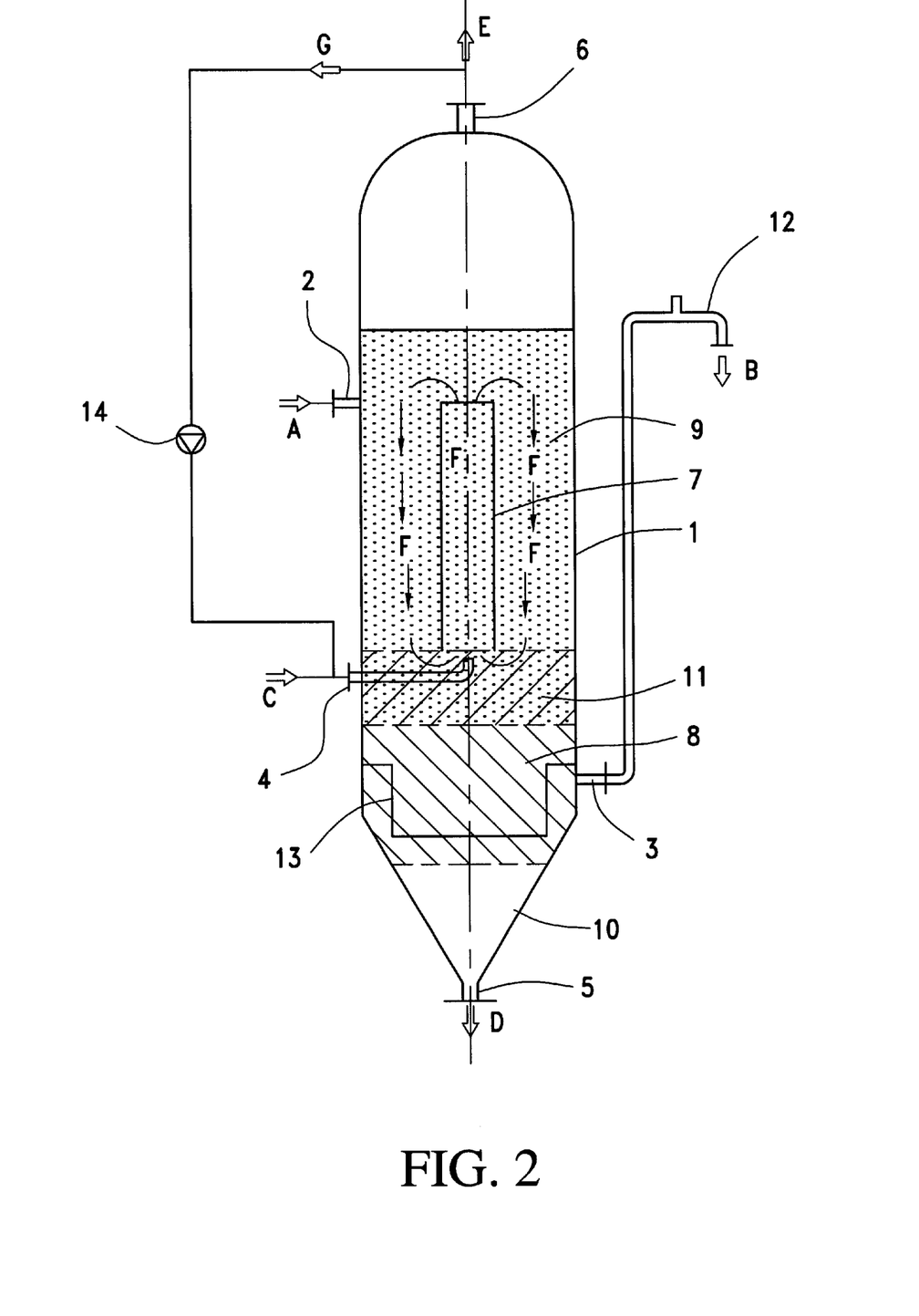
FIG. 2 represents a reactor embodiment during operation.

FIG. 2, describes the various flow directions inside the reactor during operation. On passing gas into the vessel through nozzle 4, the gas rises as bubbles through the draft tube 7, to escape out of the liquid and out of the vessel through 6. The bubble rise sets up a circulatory flow in the liquid contained in the vessel as per the directions shown as arrows F. The velocity of liquid flow depends on the rate of gassing and the relative cross sectional areas of the draft tube and the vessel. In the apparatus of the invention, the liquid flow is of sufficient velocity so as to carry with it the bed of biocarrier particles, which then expands to reach below the level of the draft tube. Once below the level of the draft tube, the liquid velocity changes direction and is oriented upward along with gas flow through the draft tube. As a result, the biocarrier particles also change direction, in the zone 11, called the disengagement zone, and forms a circulatory bed, by moving upward through the draft tube. The vessel extends below zone 11, to form zone 8, where product solids are settled. If required, baffles shown as 13 may be provided to enhance separation of product solids from the liquid effluent.

The invention is further described in the following examples that are given by way of illustration and therefore should not be construed to limit the invention in any manner.

EXAMPLE 1

Biocatalysts, usually viable micro-organisms, are retained as biofilm on the said lighter than water biocarrier particles. The growth of biofilm is naturally obtained by maintaining the biocarrier particles a certain period of time in the reactor with a suspension of the required organisms and providing the right conditions for growth. In another realization of this invention, biocarriers on which the biofilm is already cultivated may be loaded into the reactor vessel. The crucial property of the biocarrier particles is that its specific gravity is less than that of the fluid in the reactor vessel, causing the formation of a floating bed of particles. Any agitation of the bed will cause solid particles heavier than liquid to get disengaged from the bed and settle at the bottom of the vessel. The introduction of gas into the vessel such that rising gas bubbles are confined within the draft tube, leads to a circulatory flow of liquid, in the upward direction within the draft tube and the downward direction outside the draft tube. This circulatory motion is as a result of hydrostatic pressure difference between inside and outside of the draft tube as a result of gassing. The circulatory motion, when sufficiently strong, entrains with it the floating biocarrier bed. This enables good mixing of bed particles with gas bubbles and the liquid stream. It also enable the disengagement of biocarriers from inert particles or solid particles present in the liquid or formed as a result of the reaction. In all practical uses envisaged, the solid particles are heavier than the liquor inside the reactor and has therefore the tendency to settle down, while the biocarrier particles have the tendency to float. The biocarriers itself being in agitated state, is constantly being abraded by contact between themselves and this is the mechanism for preventing the growth of biofilm to such extent so as to retard mass transfer of reactants to the interior of the biofilm or products to the exterior of the biofilm. The constant agitation also aids in the removal of solid products from the biofilm. The reactor may be provided with inlet and outlet nozzles for continuous input and output of liquor as well as to discharge any settled solids. Thus the invention is able to meet all the object set herein.

A reverse fluidized loop reactor (RFLR) of dimensions given below was set up and its performance for the biological oxidation of a sulphide containing wastewater to precipitate sulphur was investigated.

The wastewater had the composition given below. The flow rate to the reactor was fixed at various levels so as to achieve a predetermined sulphide loading rate defined as gram sulphide per day fed to 1 liter volume of reactor. The flow rate was increased when steady efficiency of sulphide conversion was achieved. The objective of the experiment was to determine the maximum sulphide loading rate attained in the process.

| Component | Conc. mg/l |
|---|---|
| sodium sulphide (pure) | 584.1 |
| sodium bicarbonate | 67.01 |
| dipotassium hydrogen phosphate | 92.3 |
| potassium dihydrogen phosphate | 92.3 |
| magnesium sulfate, 7 H$_2$O | 18.4 |
| adjusted pH of media for experiments without active pH control of reactor trace element solution | 7.5 |

The reactor specifications are shown below:

| | |
|---|---|
| Liquid volume in reactor: | 550 ml |
| Diameter: | 50 mm |
| Height of liquid in reactor: | 480 mm |
| Draft tube diameter: | ID 15 mm, OD 25 mm |
| Draft tube length: | 460 mm |
| Volume of biocarrier particles when static: | 125 ml |
| Static bed length on stopping | 150 mm |
| Average dimension of biocarrier particles | 2 mm |
| Air flow rate for inducing loop flow | variable |

This bed length is not related to bulk volume, as bed length inside draft tube will not be the same as in the annular space. However, this bed length gives a better estimate of reactor active volume, assuming static bed length can be a maximum of 50% of total volume of reactor).

The specifications of the biocarrier particles are given below:

| | |
|---|---|
| material | LDPE with 25% by weight kaolin filler |
| density of particles | 990 g/ml |
| Prepared by extrusion into long strings and chopped to size. | |

During operation the particles are fluidized and in carried through in loop circulation on account of the gas sparging. This reactor enables increased oxygenation when required. The operating regimes is also not limited by the need to prevent carry over of particles.

The control system maintains the redox potential by controlling the feed pump. When redox potential is too low the feed pump is stopped. The redox electrode is located such that it is protected from aeration bubbles which cause readings to fluctuate. A pH control system was used to automatically control the reactor pH, which increases as a result of sulphide conversion to sulphur, during some of the studies. The pH electrode was installed directly inside the reactor.

The RFLR achieves the following performance:

| | |
|---|---|
| Sulphide Loading Rate | 20 kg/m$^3$/d (even at reactor pH > 9.5) |
| Sulphide Removal Efficiency | 99% |
| Expected Sulphur Yield | 80% (varies with size) |
| Hydrodynamic Stability | Very good |
| Process Stability | Can be controlled using Redox |
| System start-up | Rapidly achieves steady state |
| Product sulphur | Removed easily from system for disposal |

This example shows the improved performance of the process because of the high sulphide loading rate and sulphide conversion efficiency. Those in the art will appreciate that sulphide loading rate with high conversion beyond 5 kg/m$^3$/d is not practical as conventionally practiced. This example demonstrates attainment of the objectives of the reactor system.

Using the method and apparatus of this invention, it is possible to carry out reactions for the purification of wastewater using biologically enhanced aerobic reactions that result in the production or precipitation of solid products. A good example of such a reaction is the biological partial oxidation of sulphide to sulphur. Another example is the biological oxidation of dissolved iron in the ferrous state to ferric state that precipitates as in the form of oxides and hydroxides. A different example is the reduction of heavy metal sulfate containing wastewater to sulphide precipitates using sulfate reducing bacteria, where the reductant is a hydrogen containing gas. Such waste product solids can easily be removed from the device along with the treated water for subsequent separation, while the biological agents that catalyze the reactions are retained within the reaction vessel. The process of this invention enables carrying out the above processes at high rates of reaction by retaining the desired population of micro-organisms within the reactor while preventing deposition and contamination by inert products.

An embodiment of the present invention has the following advantages of over other systems: wide range of operating conditions under which biocarrier particles are retained within the reaction vessel; well defined flow pattern within the reaction vessel enabling scale-up and engineering to suit varied applications; effective removal of all solid reaction products from the reactor, and recovery of solids if it has value; no requirement of specially designed liquid distribution system for enabling uniform fluidization; aeration intensity and oxygen input may be increased without constraints imposed by the hydrodynamics of the reactor; no external pumping loop required; high energy efficiency as compared with fluidized bed reactors; biocarrier materials and sizes may be chosen from a wide range of buoyant materials without constraints imposed by the hydrodynamics of the reactor; greater tolerance for non-uniformity in particle size of the biocarrier particles; and purification of water to acceptable quality on a continuous basis.

The present disclosure including Examples and Description of the Preferred Embodiments are exemplification of the invention and as such should not be considered as limiting.

Those skilled in the art may recognize other equivalents to the specific embodiments described herein which equivalents are intended to be encompassed by the claims attached hereto.

We claim:

1. An apparatus for biological treatment of waste water, comprising:
   a vertically elongated reaction vessel having at least one waste water inlet;
   the reaction vessel comprising a biocarrier particulate zone, a disengagement zone, and a turbulence free zone;
   at least one waste water outlet on the vessel;
   at least one gas inlet on the vessel;
   at least one source for supplying a gas;
   at least one draft tube open at both ends and mounted on a bottom of the vessel, the draft tube having a vertical length less than a level of waste water to be maintained in the vessel; and
   a particulate bed having a microbial film capable of causing an impurity of the waste water to form a solid product, the particulate bed comprising materials having a specific gravity lower than a specific gravity of the waste water.

2. The apparatus of claim 1, wherein the reaction vessel further comprises a conical shaped bottom, an outlet through which a settled matter may be removed, a lid with at least one exhaust gas outlet on a top of the vessel through which exhaust gases may be removed, a mechanism to maintain constant level of liquid in the reactor, a pump for recirculating the exhaust gases, and at least one baffle to separate the solid product from the waste water.

3. The apparatus of claim 2, wherein the mechanism to maintain constant level of waste water inside the reaction vessel is selected from the group consisting of a valve and a raised outlet tube raised to the level of the waste water in the reaction vessel.

4. The apparatus of claim 1, wherein the waste water inlet terminates proximate to the draft tube.

5. The apparatus of claim 1, wherein the gas inlet nozzle is positioned to direct a gas upward toward a top of the reaction vessel.

6. The apparatus of claim 1, further comprising means for flowing a gas through the gas inlet nozzle and through the draft tube.

7. The apparatus of claim 6, wherein the gas comprises at least one reactant component.

8. The apparatus of claim 1, wherein the gas is selected from the group consisting of oxygen and hydrogen.

9. The apparatus of claim 1, wherein the microbial film comprises microbes selected from the group comprising sulphide oxidizing microbes, iron oxidizing microbes, manganese oxidizing microbes and sulfate reducing microbes.

10. The apparatus of claim 1, wherein the microbial film comprises sulphide oxidizing bacteria and the gas comprises oxygen.

11. The apparatus of claim 1, wherein the microbial film comprises iron oxidizing bacteria and the gas comprises oxygen.

12. The apparatus of claim 1, wherein the microbial film comprises manganese oxidizing bacteria and the gas comprises oxygen.

13. The apparatus of claim 1, wherein the microbial film comprises sulfate reducing bacteria, the gas comprises hydrogen, and the solid product comprises metal sulphides.

14. The apparatus of claim 1, wherein the particulate bed has specific gravity between 0.9 and 0.99.

15. The apparatus of claim 1, wherein the particulate bed comprises low density polyethylene.

16. The apparatus of claim 15, wherein the particulate bed further comprises filter material.

17. The apparatus of claim 16, wherein the filter material comprises Kaolin.

18. The apparatus of claim 16, wherein the particulate bed comprise low density polyethylene and the filter material comprises Kaolin.

19. The apparatus of claim 1, wherein the particulate bed comprises particles between 1 mm and 10 mm in diameter.

20. The apparatus of claim 19, further comprising means for circulating the particles in vertical loops within the reactor in response to a flow of gas therein.

21. The apparatus of claim 1, wherein the particulate bed floats immersed in the waste water within the reaction vessel.

22. The apparatus of claim 1, wherein the particulate bed is distributed.

23. The apparatus of claim 1, wherein the particulate bed is segregated from the solid due to buoyancy.

24. The apparatus of claim 1, further comprising a settling zone for the solid product adjacent the bottom of the reaction vessel.

25. The apparatus of claim 1, further comprising means for removing the solid product from the microbial film by exerting a shearing force on the microbial film.

26. The apparatus of claim 1, wherein the gas comprises off-gas from the reaction vessel.

27. The apparatus of claim 1, further comprising means for recirculating a portion of the waste water to the reaction vessel.

28. The apparatus of claim 1, wherein the turbulence free zone is located below a bottom level of the draft tube.

29. The apparatus of claim 1, wherein the turbulence free zone is located below a level at which a gas is introduced into the reactor vessel.

* * * * *